United States Patent Office 3,312,607
Patented Apr. 4, 1967

3,312,607
METHOD OF PRODUCING SOLID SOLUTIONS OF THE CARNALLITE TYPE
Robert D. Goodenough, and Remigius A. Gaska, Midland, and Richard C. Belski, Bay City, Mich., assignors to The Dow Chemical Company, Midland, Mich., a corporation of Delaware
No Drawing. Filed Nov. 4, 1963, Ser. No. 321,332
4 Claims. (Cl. 204—70)

The invention relates to a method of producing solid solutions of the carnallite type and, more particularly, is concerned with the production from brines of carnallite compounds corresponding to the empirical formula $MgCl_2 \cdot xKCl \cdot yNH_4Cl \cdot 6H_2O$, wherein the sum of the mole fractions of $x(KCl)$ and $y(NH_4Cl)$ is equal to the number of moles of $MgCl_2$.

In the manufacture of magnesium by electrolysis of magnesium chloride, certain magnesium reduction cells require the presence of a fixed amount of potassium chloride in the anhydrous magnesium chloride cell feed. The method of this invention allows one to prepare a solid solution of $MgCl_2 \cdot xKCl \cdot yNH_4Cl \cdot 6H_2O$ containing the desired fixed weight ratio of magnesium chloride to potassium chloride. The actual cell feed may be prepared by desiccation of the waters of hydration and sublimation of ammonium chloride from the compositions of the present invention.

It is an object of the instant invention to provide a method for producing a solid solution of $$MgCl_2 \cdot xKCl \cdot yNH_4Cl \cdot 6H_2O$$

containing a desired fixed weight ratio of magnesium chloride to potassium chloride for eventual use as a cell feed in magnesium reduction cells.

Other objects and advantages of the instant invention will become apparent from reading the detailed description disclosed hereinafter.

It has been discovered that magnesium chloride can be effectively separated from sodium, calcium, potassium, lithium and/or strontium containing brines in the form of a composition corresponding to the epirical formula $MgCl_2 \cdot xKCl \cdot yNH_4Cl \cdot 6H_2O$ by adding ammonium chloride to such brines. The mole ratio of potassium chloride to ammonium chloride in the solid solution is controlled directly by the amounts of ammonium chloride added. This enables one to arrive at a definite product composition. Using this technique, it is possible to recover magnesium chloride effectively from brines containing as little as 4 to 5 percent $MgCl_2$, and other salts.

In carrying out the method, solid ammonium chloride is added to a brine solution so as to give a weight ratio of ammonium chloride to magnesium chloride within the range of from about 0.28 to 1.7 and a weight ratio of ammonium chloride to potassium chloride within the range of from about 0.63 to about 3.8 thereby to precipitate $MgCl_2 \cdot xKCl \cdot yNH_4Cl \cdot 6H_2O$. In general, in the practice of the method the weight ratio of magnesium chloride to potassium chloride should be within the range of from 1.9 to 7.15. The upper limit of this range, i.e., 7.15 applies when the solution is mutually saturated with respect to both magnesium chloride and potassium chloride at 35° C. However, when the solution is not saturated with respect to potassium chloride, the upper limit will be higher than 7.15. The mixture is then heated to temperatures within the range from about 50° to about 95° C. to dissolve all the ammonium chloride and then cooled preferably to room temperature or lower. The precipitate is then filtered and dried, e.g., at a drying temperature of 70°–80° C. for a period of about 8 to about 18 hours.

If the precipitate of $MgCl_2 \cdot xKCl \cdot yNH_4Cl \cdot 6H_2O$ is removed from the brine solution at a temperature lower than room temperature (e.g. 10° C.) the recovery of $$MgCl_2 \cdot xKCl \cdot yNH_4Cl \cdot 6H_2O$$

increases. Recovery of the precipitated product at a temperature higher than room temperature (e.g., 35° C.) decreases recovery of the product.

In one variation of the method of the instant invention, a brine containing magnesium chloride, potassium chloride, calcium chloride, sodium chloride, lithium chloride and strontium chloride is evaporated, normally at its boiling point, in order to concentrate the brine solution with respect to magnesium chloride whereby a precipitation of the complex $MgCl_2 \cdot xKCl \cdot yNH_4Cl \cdot 6H_2O$ occurs on addition of ammonium chloride to said solution.

In practice, the magnesium chloride content of the brine needed to provide for precipitation of.

$$MgCl_2 \cdot xKCl \cdot yNH_4Cl \cdot 6H_2O$$

upon addition of ammonium chloride varies with the calcium salt content of the brine solution (e.g., from about 2 to about 38 weight percent calcium chloride). To illustrate, at a reaction temperature of about 35° C., e.g., brines with high calcium salt content (e.g., from 25–38 percent by weight) compensate for a low magnesium chloride content (e.g., as low as 4 percent by weight $MgCl_2$ content) and assure precipitation of the product with ammonium chloride. When the concentration of calcium salt is low (e.g., from 0 to about 25 percent) a higher $MgCl_2$ concentration (e.g., from about 27.0 to about 9.5 percent) is necessary to initiate precipitation of $MgCl_2 \cdot xKCl \cdot yNH_4Cl \cdot 6H_2O$ from the brine solution on the addition of ammonium chloride thereto.

It is to be understood that these data are for one temperature range, i.e., 35° C., other temperatures may require slightly different concentration proportions. At a lower temperature, less magnesium chloride is required; at a higher temperature more magnesium chloride will be required to achieve the desired precipitation.

The ammonium chloride should be in solid form for use in the method of the instant invention, however, the degree of particulation is not important.

Variation of the pH of the initial brine solution (e.g., from 1 to 6) does not have any significant effect on the results of the instant method.

The following example further illustrates the invention, but is not to be construed as limiting the invention thereto.

EXAMPLE

About 15 grams of ammonium chloride were added to about 200 grams of a brine having a specific gravity of 1.37 and a pH value of 3.5 and a composition on a weight basis as follows:

| Constituent: | Weight percent |
|---|---|
| Potassium chloride | 2.37 |
| Sodium chloride | 0.55 |
| Calcium chloride | 29.00 |
| Strontium chloride | 0.70 |
| Lithium chloride | 0.078 |
| Magnesium chloride | 4.80 |
| Water (by difference) about | 62.50 |

The entire mixture was then heated to 70° C. to dissolve the ammonium chloride and then cooled to 25° C. 30.4 grams of precipitate was formed. This precipitate was separated from the solution by filtration and dried at 60° C.

25.7 grams of dry precipitate was obtained. This was found to have the following composition on a weight percent basis:

| Constituent: | Weight percent |
|---|---|
| Magnesium chloride | 26.20 |
| Ammonium chloride | 19.41 |
| Potassium chloride | 4.63 |
| Sodium chloride | 0.45 |
| Calcium chloride | 12.98 |
| Water (by difference) about | 36.33 |

Calcium chloride, sodium chloride, and part of the potassium chloride not chemically bound to and in the solid solution of $MgCl_2 \cdot xKCl \cdot yNH_4Cl \cdot 6H_2O$ may be removed by washing with the precipitate. Through X-ray diffraction and chemical analysis it was proved that the precipitate, less the above impurities, was the solid solution of $MgCl_2 \cdot xKCl \cdot yNH_4Cl \cdot 6H_2O$.

Various modifications may be made in the present invention without departing from the spirit or scope thereof for it is to be understood that we limit ourselves only as defined in the appended claims.

We claim:
1. The method of producing a solid solution of

$$MgCl_2 \cdot xKCl \cdot yNH_4Cl \cdot 6H_2O$$

wherein the sum of the mole fractions of $x(KCl)$ and $y(NH_4Cl)$ equals the number of moles of $MgCl_2$, from a brine solution containing magnesium chloride and potassium chloride in a weight proportion of at least 1.9 which comprises:
 (a) adding solid ammonium chloride to the brine solution, the amount of said ammonium chloride providing a weight proportion of $NH_4Cl/KCl$ in said solution within the range of from about 0.63 to about 3.8 and a weight proportion of the $$NH_4Cl/MgCl_2$$

in said solution within the range of from about 0.28 to about 1.7;
 (b) precipitating $MgCl_2 \cdot xKCl \cdot yNH_4Cl \cdot 6H_2O$ product therein wherein the sum of the mole fractions of $x(KCl)$ and $y(NH_4Cl)$ equals the number of moles of $MgCl_2$; and
 (c) thereafter separating the precipitation product from the residual solution.

2. The method in accordance with claim 1 wherein said brine contains from about 2 to about 38 weight percent calcium chloride and from about 4 to about 27 weight percent magnesium chloride.

3. The method of producing a solid solution of $$MgCl_2 \cdot xKCl \cdot yNH_4Cl \cdot 6H_2O$$

wherein the sum of the mole fractions of $x(KCl)$ and $y(NH_4Cl)$ equals the number of moles of $MgCl_2$, from a brine solution containing at least 4 percent magnesium chloride and potassium chloride which comprises:
 (a) adding solid ammonium chloride to the brine solution, the amount of said ammonium chloride providing a weight proportion of $NH_4Cl/KCl$ in said solution within the range of from about 0.63 to about 3.8 and a weight proportion of the $NH_4Cl/MgCl_2$ in said solution within the range of from about 0.28 to about 1.7;
 (b) heating the mixture of ammonium chloride and brine solution to a temperature within the range of from about 50° to about 95° C. to dissolve substantially all the ammonium chloride;
 (c) cooling said mixture to about 25° C. thereby substantially completing precipitation of $$MgCl_2 \cdot xKCl \cdot yNH_4Cl \cdot 6H_2O$$

wherein the sum of the mole fractions of $x(KCl)$ and $y(NH_4Cl)$ equals the number of moles of $MgCl_2$;
 (d) separating said precipitate of $$MgCl_2 \cdot xKCl \cdot yNH_4Cl \cdot 6H_2O$$

from the said solution; and
 (e) drying said precipitate of $$MgCl_2 \cdot xKCl \cdot yNH_4Cl \cdot 6H_2O$$

thereby producing a solid solution of $$MgCl_2 \cdot xKCl \cdot yNH_4Cl \cdot 6H_2O$$

4. The method in accordance with claim 3 wherein said brine contains from about 2 to about 38 weight percent calcium chloride.

References Cited by the Examiner

UNITED STATES PATENTS

| 1,301,766 | 4/1919 | Wallace | 23—91 |
| 1,875,013 | 8/1932 | Kaselitz | 23—87 |
| 2,974,093 | 3/1961 | Bauer et al. | 23—87 |
| 3,181,930 | 5/1965 | Olsen | 23—91 |

HOWARD S. WILLIAMS, *Primary Examiner.*

G. KAPLAN, *Assistant Examiner.*